United States Patent Office 3,682,804
Patented Aug. 8, 1972

3,682,804
METHOD OF PREPARING MERCAPTANS USING HIGH ENERGY RADIATION
Gerald L. Kochanny, Jr., Midland, Mich., assignor to The Dow Chemical Company, Midland, Mich.
No Drawing. Filed Nov. 13, 1969, Ser. No. 876,614
Int. Cl. B01j 1/10
U.S. Cl. 204—162 HE          8 Claims

ABSTRACT OF THE DISCLOSURE

Mercaptans are prepared by reaction olefins and $H_2S$ in the presence of liquid saturated aliphatic ketones. Side reactions resulting in by-product formation are greatly reduced. The mercaptans can be converted to alkyl sulfates by oxidation.

This invention relates to a method of preparing mercaptans by commingling olefins and $H_2S$ with small amounts of a liquid ketone and subjecting the mixture to high-energy radiation, such as gamma rays.

BACKGROUND OF INVENTION

Prior art processes for making mercaptans by reaction of olefins and $H_2S$ have utilized acid or ionic catalysts or free radical catalysts including ultra-violet light. All the prior processes suffer from the fact that relatively high proportions of thioether by-products are formed, due to the reaction of the mercaptan with the olefin, or in instances where low percentages of thioethers form, the yields are generally unsatisfactorily low, even at comparatively high reaction temperature, time and pressure.

An object of this invention is to produce mercaptans in good yield by reacting olefin hydrocarbons with $H_2S$. Another object is the production of mercaptans, as described, without co-production of large amounts of by-product thioethers.

These objects are obtained by reacting an olefin hydrocarbon, or mixtures thereof, with $H_2S$ and a small but reaction-promoting amount of a liquid saturated aliphatic ketone under the influence of high energy radiation. The beneficial effects of this invention are obtained by the use of high energy (ionizing) radiation, $\alpha$-, $\beta$- and $\gamma$-rays which are emitted from radioactive nuclei or any high energy charged particle such as electrons, protons, deuterons etc., which are produced by a Van de Graaf generator, and electromagnetic radiation (X-rays). It is further specified that these radiations should be capable of passing through a 0.01 mm. aluminum sheet. The liquid saturated aliphatic ketone acts as a promoter, so that improved yields of the desired mercaptan are obtained, with little or no increase in side-reaction products. The amount of ketone can range from less than 1% to about 20% by volume based on the hydrocarbon in the reaction mixture, but quantities greater than about 5% do not show an increase in promoting effect. The temperature at which the reaction may be effected can vary between —78° C. and about 100° C. The preferred temperature range is 20° C. to 50° C.

The radiation dose required to obtain a desired conversion of olefinic hydrocarbon to primary mercaptan is dependent on the purity and the chemical nature of the reactants. However, when essentially pure reactants are used, and specifically when the olefinic hydrocarbon used is a mixture of lienar $C_9$–$C_{10}$ compounds, 0.2 megarad is usually a sufficient radiation dose to convert about 74% to about 88% of the olefin to mercaptans plus side products. Usually dosages of from about 0.1 to about 10 megarads can be used for converting the olefins to mercaptans.

The ketones which can be used include acetone, methyl ethyl ketone, diethyl ketone, methyl propyl ketone, ethyl propyl ketone, dipropyl ketone, cyclohexanone or any other ketone which is either liquid or is soluble in the mixture at the reaction temperature and pressure.

The pressure under which the reaction is run must be high enough to maintain the $H_2S$ in a liquid state at the reaction temperature.

The mole ratio of $H_2S$ to olefin must be greater than 1 to 1 and is preferably in the range of from 30 to 90 moles of $H_2S$ per mole of olefin.

The materials of construction of the reaction should be resistant to $H_2S$ and the mercaptan. Recommended materials are glass lined or stainless steel based reactors.

Ordinarily, commercially grades of reactants can be employed.

Typically olefins that can be converted to mercaptans are those having from 2 to 20 C atoms. Specific olefins include ethylene, propylene, the butylenes, pentenes, hexenes, heptenes, octenes, nonenes, decenes, undecenes, dodecenes, tridecenes, tetradecenes, pentadecenes, hexadecenes, heptadecenes, octadecenes, nonadecenes, eicosenes, cyclohexene, cycloheptene, cyclooctene, and aromatic hydrocarbon substituted olefins in which the aromatic hydrocarbon group has from 1 to 3 rings which can be fused or non-fused. The aromatic hydrocarbon group can contain from 1 to 5 alkyl substituents of 1 to 20 C atoms per alkyl group. Representative aromatic substituted aromatic olefins include styrene, vinyl toluene, 3-phenyl propene, and divinylbenzene. Most preferred are aliphatic hydrocarbons having from about 8 to about 14 C atoms.

The position of the olefinic linkage is not important, since terminal and non-terminal olefins can be converted to mercaptans. When the olefinic group is terminal, the mercapto group is substantially exclusively in the 1 position on the molecule, i.e., the $H_2S$ addition is an anti-Markownikoff one.

That liquid ketones will increase the reaction rate between $H_2S$ and an olefin to form mercaptans when exposed to high energy radiation is surprising, in view of the known differences between high energy radiation and photochemically induced reactions. It is known that in photochemically induced reactions, each photon excites a single molecule, so that it is often possible to produce a single excited state in a particular component in the reaction system. The excited species are distributed essentially uniformly in any plane at right angles to the beam of light. In high energy ray induced reactions, excitation of a large number of molecules lying in the path of the ray is effected. Thus, any molecule in the state of excitation is ionized and capable of reacting with another ionized molecule whether of the same type or different. It would therefore be expected that under the influence of high energy rays, the olefins would react with each other, and with the ketone, as well as with the $H_2S$. In addition, it would be expected that any mercaptan which formed would react with the olefin or other ionized species in the mixture.

The examples which follow are intended to illustrate, not to limit the invention. All parts or percentages are by weight unless expressly otherwise indicated.

EXAMPLE 1

General procedure

In these tests glass ampules encased in a stainless steel jacket were employed. A uniform quantity of 0.29 g. of a mixture of 30 wt. percent 1-nonene and 70 wt. percent 1-decene was placed in a group of ampules. The olefinic hydrocarbon used in this experiment was used as received from the manufacturer without further purification. Various quantities of acetone were then added. The ampules were cooled to —196° C. and evacuated to $10^{-2}$ mm. Hg and then the mixture allowed to thaw under vacuum. The evacuation at liquid nitrogen temperature was repeated to remove as much air as possible from the ampule. The ampules were next cooled to −78° C. in a Dry Ice-acetone bath and 2.98 g. of $H_2S$ were added. The ampules were again cooled to −196° C., sealed, placed in the stainless steel tube, and warmed to room temperature. The samples were then irradiated to a predetermined gamma radiation dosage, using cobalt 60 as the radiation source.

After irradiation the ampules were cooled to −196° C., opened and unreacted $H_2S$ was vented slowly. The remaining liquid was analyzed by gas chromatography to determine the percentages of mercaptan, unreacted olefin and by-products (sulfides and disulfides). Included among the samples tested were controls containing no acetone. Tabulated below are the results obtained with 0.2, 0.5 and 0.9 megarad dosages.

TABLE 1

| Radiation dose (Mrad) | Wt. percent acetone | Percent unreacted olefin | Percent mercaptan produced | Percent side products |
| --- | --- | --- | --- | --- |
| 0.2 | None | 44.8 | 54.1 | 1.1 |
| 0.5 | None | 25.1 | 71.5 | 3.4 |
| 0.9 | None | 11.9 | 85.0 | 3.1 |
| 0.2 | 1.2 | 35.0 | 63.6 | 1.4 |
| 0.5 | 1.2 | 17.2 | 80.2 | 2.6 |
| 0.9 | 1.2 | 10.0 | 86.7 | 3.3 |
| 0.2 | 10.9 | 22.6 | 74.3 | 3.1 |
| 0.5 | 10.9 | 7.8 | 88.0 | 4.2 |
| 0.9 | 10.9 | 4.4 | 91.3 | 4.3 |

These data show that acetone effects a higher degree of conversion at any given radiation dosage. Thus, considerably less radiation is required to drive the reaction to completion in the presence of the ketone. The data when compared with those of Example 2 show that when impurities are present in the olefin a higher dosage of radiation is needed to convert high percentages of the unsaturated hydrocarbon to mercaptans.

EXAMPLE 2

In this example the same manipulative procedure described in Example 1 was used with the exception that the olefinic hydrocarbon was distilled before use. A constant radiation dosage of 0.2 megarad, and various ketones were employed. In each test 0.2 to 0.4 ml. of the ketone was added to 0.4 ml. of the $C_9$–$C_{10}$ purified mixture in the ampule prior to the addition of 3.1 ml. of liquid $H_2S$. The data are tabulated below.

TABLE 2

| Ketone | Mercaptan yield, percent | |
| --- | --- | --- |
|  | With ketone | Without ketone |
| Methyl ethyl ketone | 89 | 82 |
| Cyclohexanone | 88 | 82 |
| Acetone | 91 | 78 |

Although the mercaptan yields obtained in the presence of ketone do not appear to be significantly higher than those obtained in the absence of ketone, the nature of the reaction is such that, in the region of mercaptan yields listed above, appreciably more radiation would be required to gain the increased yields which were obtained by simply adding a ketone to the reaction mixture, because the reaction without ketone levels off at about 82% conversion and requires heavy dosages of radiation to proceed further.

EXAMPLE 3

A stainless steel vertical coil reactor ¼ in. in diameter and about 1250 in. long was used for this continuous run. Feed entered the top of coil and the mixture after reaction was removed through a tube extending from the reactor to the top. The coil reactor was completely surrounded by a jacket for circulating a temperature control fluid. Gamma radiation sources were placed adjacent the internal and external walls of the jacket. In this instance the total radiation during the run amounted to about .18 mrad./hr.

$H_2S$ from a cylinder was cooled and liquified and the liquid was fed to a ¼ in. stainless steel tube with a Lapp "micro-pulsa feeder" pump. A mixture of 20 volume percent acetone and the $C_9$–$C_{10}$ olefin mixture of Example 1 was fed to the reactor with a Milton-Roy measuring pump. The feed ingredients were blended just before entering the reactor. For tests without a ketone the feed rate was 13.75 ml. of the described $C_9$–$C_{10}$ olefin and 151.25 ml. $H_2S$ per hour. For tests with acetone in the feed, the feed consisted of 151.25 ml. $H_2S$ and 17.18 ml. of the acetone-olefin mixture per hour. Operating pressure in each instance was approximately 310 p.s.i.g. It is estimated that residence time in the reactor was about 6 hours. The reactor effluent was passed through a pressure relief valve system to a flash evaporator where $H_2S$ and volatiles were removed at about 25° C. The liquid fraction was collected from the bottom of the flash evaporator and analyzed. It was found that a "steady state" had been attained in the reaction period when acetone was fed into the reactor. The reactor effluent showed a yield of about 72% $C_9$–$C_{10}$ 1-mercaptans, small amounts of the $C_9$–$C_{10}$ thioether and the remainder of the $C_9$–$C_{10}$ olefin was unreacted.

The comparative run without acetone in the feed, showed that a reaction period of 11–15 hours was needed to reach the "steady state" of the reaction in which about 72% of mercaptans were obtained.

Carbonyl compounds such as 37% aqueous formaldehyde and benzaldehyde had a negative effect on the reaction in that yields of mercaptan were lowered in their presence.

The reaction can be run in the presence of inert diluents. Liquid aromatic hydrocarbons devoid of aliphatic unsaturation and saturated aliphatic or alicyclic hydrocarbons are inert and can be used as diluents.

I claim:

1. A method of preparing mercaptans by the reaction of hydrocarbons of from 2 to 20 C atoms having olefinic unsaturation with a mole ratio of $H_2S$ to olefin greater than 1 to 1 and from about 1 to about 20% by volume of a liquid aliphatic ketone, at a temperature of −78° C. to about 100° C., the improvement comprising exposing the reaction mixture to a dosage of from about 0.1 to about 10 megarads of high energy ionizing radiation capable of passing through a 0.01 mm. aluminum sheet.

2. The method of claim 1 in which the radiation is supplied as gamma rays.

3. The method of claim 1 in which the hydrocarbon is an aliphatic hydrocarbon having from 4 to about 20 C atoms and the unsaturation is terminal.

4. The method of claim 1 in which the hydrocarbon has from about 8 to about 14 C atoms.

5. The method of claim 1 in which the ketone is methyl ethyl ketone.

6. The method of claim 1 in which the ketone is cyclohexanone.

7. The method of claim 1 in which the ketone is acetone.

8. The method of claim 1 in which the hydrocarbon is a $C_9$–$C_{20}$ aliphatic terminal monoolefin and the ketone is acetone.

References Cited

UNITED STATES PATENTS

| 3,257,302 | 6/1966 | Warner | 204—162 R |
| 3,412,001 | 11/1968 | Edwards | 204—162 R |
| 3,334,036 | 8/1967 | Wright | 204—162 R |

BENJAMIN R. PADGETT, Primary Examiner

U.S. Cl. X.R.

204—158 HE